(No Model.) 2 Sheets—Sheet 1.
F. W. HALES.
Ditching Machine.
No. 240,124. Patented April 12, 1881.
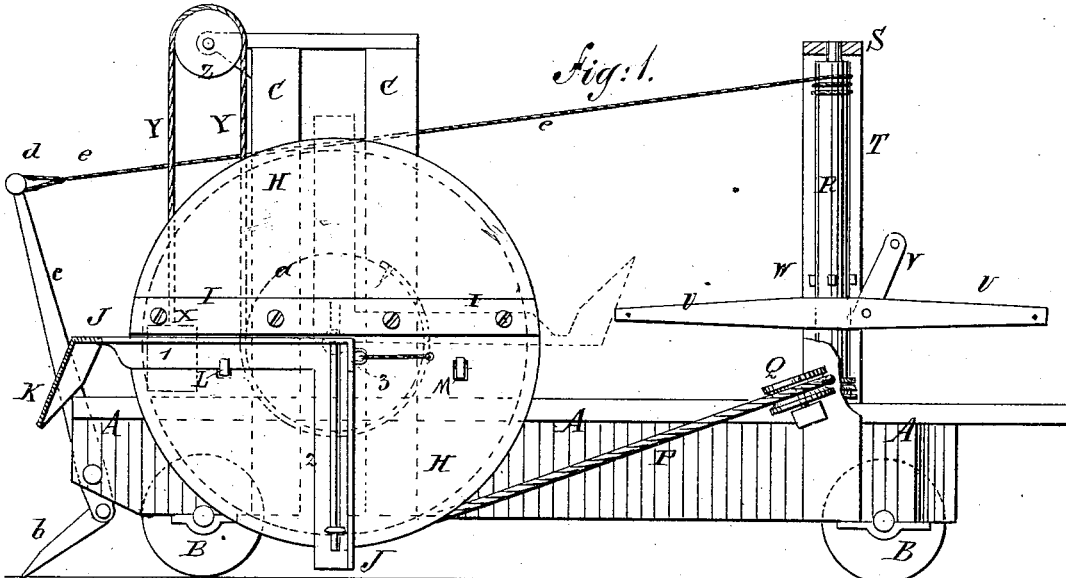
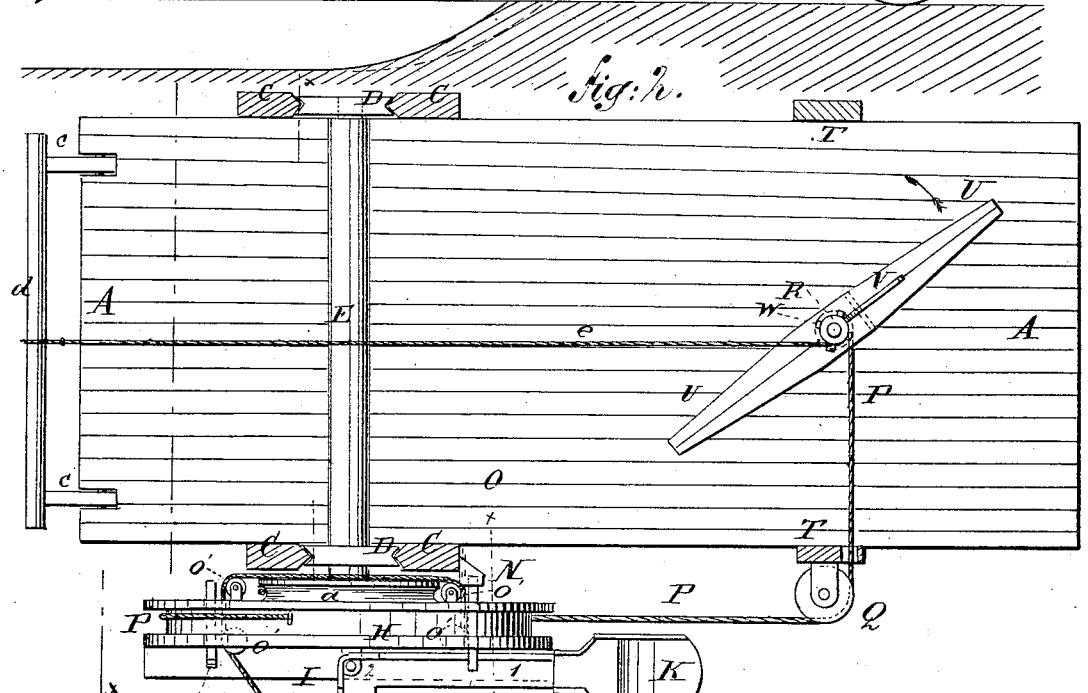
WITNESSES:
Chas. Nida
C. Sedgwick
INVENTOR:
F. W. Hales
BY Munn & Co
ATTORNEYS.

(No Model.) 2 Sheets—Sheet 2.

F. W. HALES.
Ditching Machine.

No. 240,124. Patented April 12, 1881.

WITNESSES:
Chas. Nida
C. Sedgwick

INVENTOR:
F. W. Hales
BY Munn & Co.
ATTORNEYS.

UNITED STATES PATENT OFFICE.

FREDERICK W. HALES, OF CHARLOTTE TOWN, PRINCE EDWARD ISLAND, CANADA.

DITCHING-MACHINE.

SPECIFICATION forming part of Letters Patent No. 240,124, dated April 12, 1881.

Application filed July 22, 1880. (No model.)

*To all whom it may concern:*

Be it known that I, FREDERICK WILLIAM HALES, of Charlotte Town, Prince Edward Island, Canada, have invented a new and useful Improvement in Ditching - Machines, of which the following is a specification.

Figure 3:
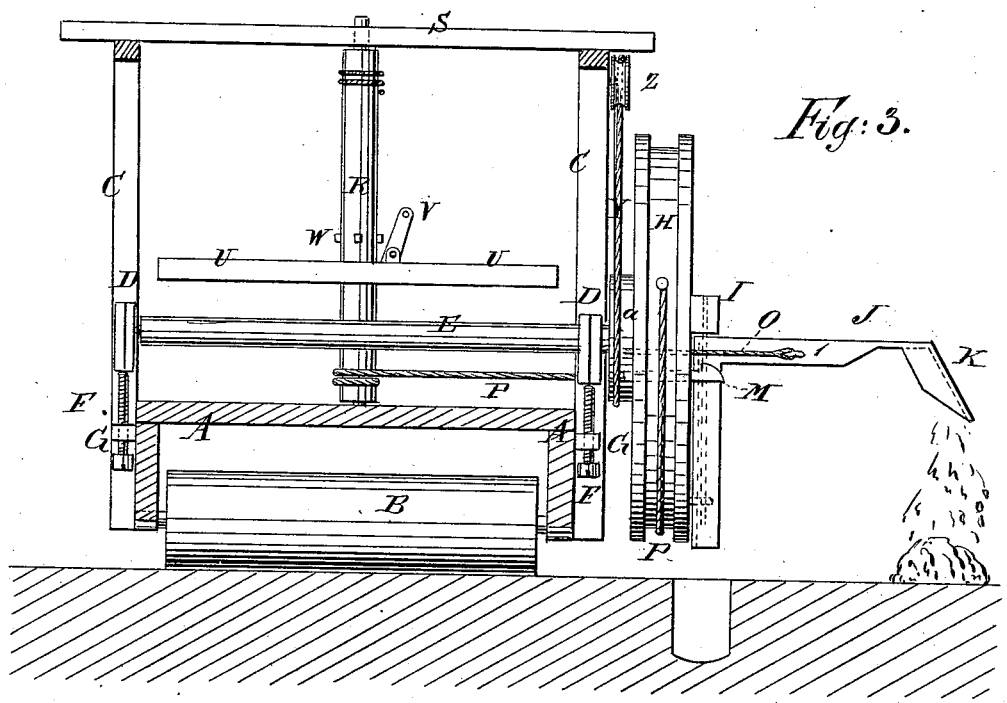
Figure 4:
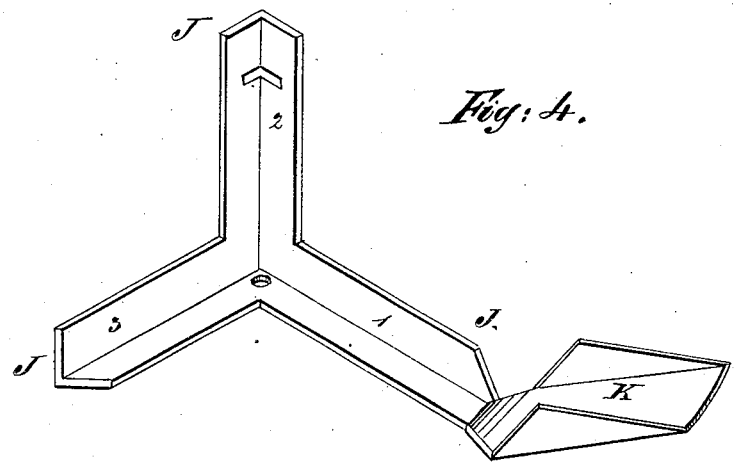

Figure 1, Sheet 1, is a side elevation of the improvement. Fig. 2, Sheet 1, is a sectional plan view. Fig. 3, Sheet 2, is a sectional end elevation taken through the line $x\ x$, Fig. 2. Fig. 4, Sheet 2, is a perspective view of the three-armed bar and shovel. Fig. 5 is a detail view, showing the catches and trip for releasing them.

Similar letters of reference indicate corresponding parts.

The object of this invention is to furnish ditching-machines designed especially for opening ditches through wet or swampy grounds, but which may be used with advantage for other ditching, and which shall be simple in construction and conveniently operated and controlled.

The invention consists in constructing a ditching-machine of a frame mounted upon rollers, a shaft adjustable vertically to regulate the depth of the ditch, a large grooved wheel attached to the adjustable shaft, and having a cross-bar attached to its outer side, a three-armed hinged bar carrying a shovel, a mechanism for reversing and holding the three-armed bar, a mechanism for turning the large wheel forward and backward, and a mechanism for feeding the machine forward automatically at the proper time, as will be hereinafter fully described.

A represents a horizontal frame or platform, which is mounted upon rollers B.

To the sides of the rear part of the frame or platform A are attached two slotted standards, upon which the bearings D for the shaft E move up and down. The bearings D are moved to adjust the shaft E at any desired distance from the ground by screws F, which pass through nuts G, attached to the frame A. The screws F may be connected by a crank-shaft and beveled-gear wheels, so that they may be moved together, which crank-shaft and beveled-gear wheels are not shown in the drawings. One end of the shaft E projects, and to it is attached a large wheel or pulley, H, to the outer side of which is attached a cross-bar, I, in such a position as to cross the side of the said wheel at one side of its center.

J is a three-armed bar, which I prefer to make of angle-iron, to give it the requisite strength without making it too heavy, and the arms 1 2 3 of which meet at right angles, as shown in Fig. 4.

To the outer end of the arm 1 of the bar J is attached, or upon it is formed, a large shovel, K, capable of taking up a cart-load, more or less, of soil at a time. The three-armed bar J is hinged to the wheel H by its middle arm, 2, with its said middle arm resting against the wheel H at right angles to the cross-bar I, and with the angle of the said bar J at the center of the wheel H, so that one or the other of the arms 1 3 may rest against the cross-bar I as the said bar J is turned upon its hinges, whereby the arm 1, that carries the shovel K, may rest upon the cross-bar I when the shovel is being filled, and may be swung out at right angles with the wheel H when the shovel is to be emptied. The three-armed bar J is held in place, when the shovel K is in position to be filled, by a spring-catch, L, attached to the wheel H, and which engages with the arm 1, as shown in Figs. 1 and 2. The three-armed bar J is held in place, when the shovel K is in position to be emptied, by a spring-catch, M, attached to the wheel H, and which engages with the arm 3, as shown in Fig. 3. The shanks of the spring-catches L M project at the inner side of the wheel H, so that as the wheel H makes its half-revolution the rearwardly-projecting ends of the catches strike alternately against a stop, N, attached to the standard C of the frame A, or other suitable support, and disengage the said catches from the bar J at the proper time.

O is a rope, which passes along the inner side of the wheel H, around guide-pulleys O′, pivoted in holes in the said wheel, and its ends are attached to the arms 1 3 of the three-armed bar J, so that the attendant can turn the said bar J as soon as it is released by either of the catches L M, by pulling the said rope O. The rim of the wheel H is grooved, as shown in Figs. 2 and 3, to receive the rope or chain P, one end of which is attached to the said wheel H. The rope or chain P makes one or more turns around the wheel H, passes around a guide-pulley, Q, pivoted to the frame A, or to a support attached to the said frame, and its end is attached to the capstan R, pivoted at its lower end to the frame A and at its upper end to a cross-bar, S, attached to the upper ends of posts T, the lower ends of which are attached to the said frame A.

U is the sweep, to the ends of which the horses or other power is attached, and through a hole in the center of which the capstan or vertical shaft R passes.

To the sweep U is hinged a catch-lever, V, which can be readily thrown into and out of gear with the catch-pins or teeth W, attached to the capstan R, to connect and disconnect the sweep U and capstan R, as required.

With this construction, when the catch-lever V is in gear, the movement of the sweep U will turn the capstan R, wind the rope P upon the said capstan, and turn the wheel H forward, forcing the shovel K through the ground and filling the said shovel. As the arm 1 of the bar J comes into a horizontal position, as shown in Fig. 2, the catch-lever V is thrown out of gear by the driver. The three-armed bar J is turned upon its hinges by an attendant upon the platform A, bringing the arm 1 into a position at right angles with the wheel H, as shown in Fig. 3, and the said wheel H is turned back through a half-revolution by the weight X, inverting the shovel K, and discharging its load at a distance from the side of the ditch equal to the length of the arm 1 of the bar J.

The weight X may be attached directly to the wheel H, or it may be attached to the end of a rope, Y, which passes over a guide-pulley, Z, attached to a standard, C, or other suitable support, and its other end is attached to and wound around a pulley, a, attached to the said wheel H, so that the said weight will be raised at each forward movement of the said wheel H. The weight X, when attached directly to wheel, should be attached near the periphery of the wheel, in front of and about midway between the outer end of the arm 2 of three-armed bar J, when the said arm 2 is in a vertical position and its outer end upward, and the outer end of the cross-bar I.

The machine is fed forward by the dogs b, pivoted to the lower ends of the levers c, which are pivoted to the rear part of the frame A, and have their upper ends connected by a cross-bar, d, so that the machine will be fed forward in a straight line.

To the cross-bar d is attached the end of a rope, e, the other end of which is attached to the capstan R, so that the machine may be fed forward automatically, and as the shovel K is making a cut. The rapidity of feed can be regulated by adjusting the pivoting-points of the levers c.

Having thus described my invention, what I claim as new, and desire to secure by Letters Patent, is—

1. A ditching-machine constructed substantially as herein shown and described, consisting of the frame A, mounted upon rollers B, the shaft E, working in adjustable bearings D, the large grooved wheel H, having cross-bar I, the hinged three-armed bar J, carrying the shovel K, the spring-catches L M, the trip N, the shifting-rope O, the draw-rope P, capstan R and sweep U, the reversing-weight X, and the feed mechanism b c d e, as set forth.

2. In a ditching-machine, the combination, with the carriage A B, of the large grooved wheel H, having cross-bar I, and mounted upon a vertically-adjustable shaft, E, the hinged three-armed bar J, carrying shovel K, and an operating mechanism, substantially as herein shown and described, whereby the soil will be raised and discharged by the forward and backward movements of the said wheels, as set forth.

3. In a ditching-machine, the combination, with the wheel H, carrying the three-armed bar J, and shovel K, of the rope P, capstan R, and sweep U, for turning the wheel forward, and the weight X, for turning it backward, substantially as herein shown and described.

4. In a ditching-machine, the combination, with the wheel H and the three-armed bar J, carrying shovel K, of the spring-catches L M, the trip N, and the reversing-rope O, substantially as herein shown and described, whereby the position of the three-armed bar J is changed, as set forth.

5. In a ditching-machine, the combination, with the carriage A B and the capstan R, of the dogs b, levers c, and rope e, substantially as herein shown and described, whereby the machine is fed forward at the proper time, as set forth.

FREDERICK W. HALES.

Witnesses:
JAMES T. GRAHAM,
C. SEDGWICK.